United States Patent [19]

Wiacek et al.

[11] Patent Number: 4,789,273
[45] Date of Patent: Dec. 6, 1988

[54] MILLING CUTTER

[75] Inventors: Stanley P. Wiacek; Ernest G. Flonders, both of St. Catharines, Canada

[73] Assignee: General Motors of Canada Ltd., Oshawa, Canada

[21] Appl. No.: 21,042

[22] Filed: Mar. 2, 1987

[51] Int. Cl.[4] .......................... B23C 5/06; B23C 5/08
[52] U.S. Cl. ........................ 407/34; 407/42; 407/51; 407/61
[58] Field of Search ............ 407/31, 34, 35, 36, 407/37, 38, 39, 42, 51, 53, 55, 56, 57, 58, 60, 61

[56] References Cited

U.S. PATENT DOCUMENTS

| | | | |
|---|---|---|---|
| 404,940 | 6/1889 | Whitney | 407/31 |
| 1,126,107 | 1/1915 | Simmons | 407/53 |
| 1,460,030 | 6/1923 | Mattson | 407/39 |
| 1,472,960 | 11/1923 | Conklin | 407/29 |
| 1,643,474 | 9/1927 | Simmons | 407/21 |
| 1,747,713 | 2/1930 | Haulista | 407/42 |
| 2,178,590 | 11/1939 | Kraus | 409/228 |
| 2,186,417 | 1/1940 | Kraus | 407/34 |
| 2,333,653 | 11/1943 | Kraus | 407/38 |
| 2,348,089 | 5/1944 | Niekirk | 407/34 |
| 2,367,221 | 1/1945 | Kraus | 407/39 |
| 2,426,382 | 8/1947 | Wilson | 402/39 |
| 2,761,196 | 9/1956 | Graves et al. | 407/34 |
| 3,106,011 | 10/1963 | Clifton et al. | 407/35 |
| 3,163,919 | 1/1965 | Turner | 407/38 |
| 3,200,474 | 8/1965 | Kralowetz | 407/46 |
| 3,203,072 | 8/1965 | Careve | 407/53 |
| 3,643,310 | 2/1972 | Kilbourne et al. | 407/36 |
| 3,670,380 | 6/1972 | Moore et al. | 407/40 |
| 3,818,562 | 6/1974 | Lacey | 407/40 |
| 4,171,926 | 10/1979 | Dusza | 407/52 |
| 4,194,860 | 3/1980 | Hopkins | 407/42 |
| 4,309,132 | 1/1982 | Adamson et al. | 407/49 |
| 4,311,075 | 1/1982 | Sundstrom | 83/848 |
| 4,352,609 | 10/1982 | Hopkins | 407/42 |
| 4,529,338 | 7/1985 | Erkfritz | 407/35 |
| 4,586,855 | 5/1986 | Rawle | 407/55 |

OTHER PUBLICATIONS

"Milling Handbook of High-Efficiency Metal Cutting", General Electric, 1980, p. 52.
"MDC Data Briefs", Metcut Research Associates, 1983, pp. DB1-DB2, J. P. Tool Ltd. Drawing Prints (10), 1981-1985.

Primary Examiner—Frederick R. Schmidt
Assistant Examiner—William E. Terrell
Attorney, Agent, or Firm—Patrick M. Griffin

[57] ABSTRACT

An indexable milling cutter has inserts arranged in a configuration of densely packed pairs, or intermeshed circular rows, of cooperating inserts, with predetermined small radial and axial differentials between the cutting corners of the insert pairs. In addition, the pitch between adjacent inserts of the pairs varies from a greater to a lesser pitch, and the axial rake angle of the insert pairs alternates from substantially zero to a small negative angle. The configuration is effective to create reduced size chips, yielding both improved surface quality and significantly reduced insert wear.

4 Claims, 4 Drawing Sheets

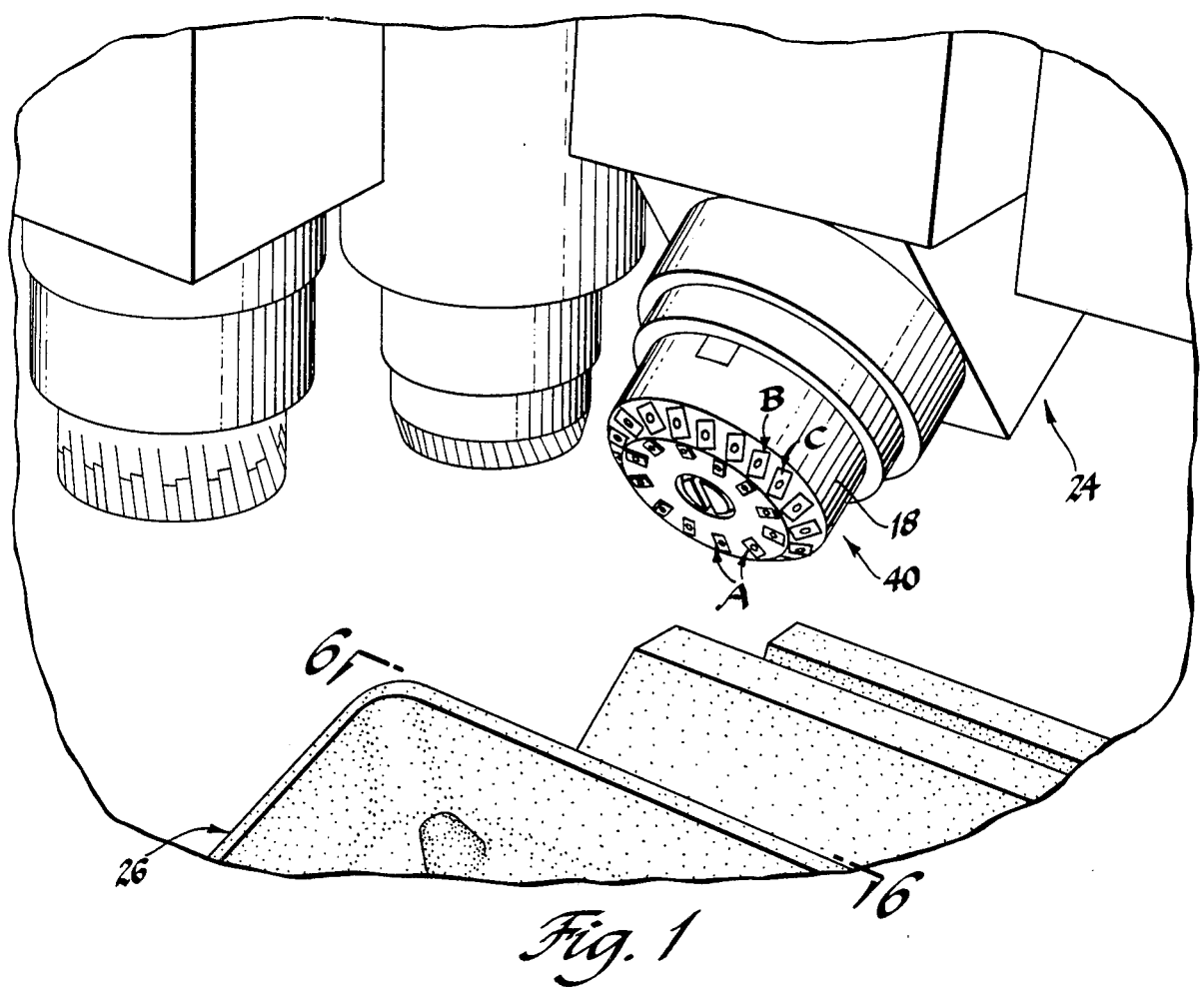
Fig. 1
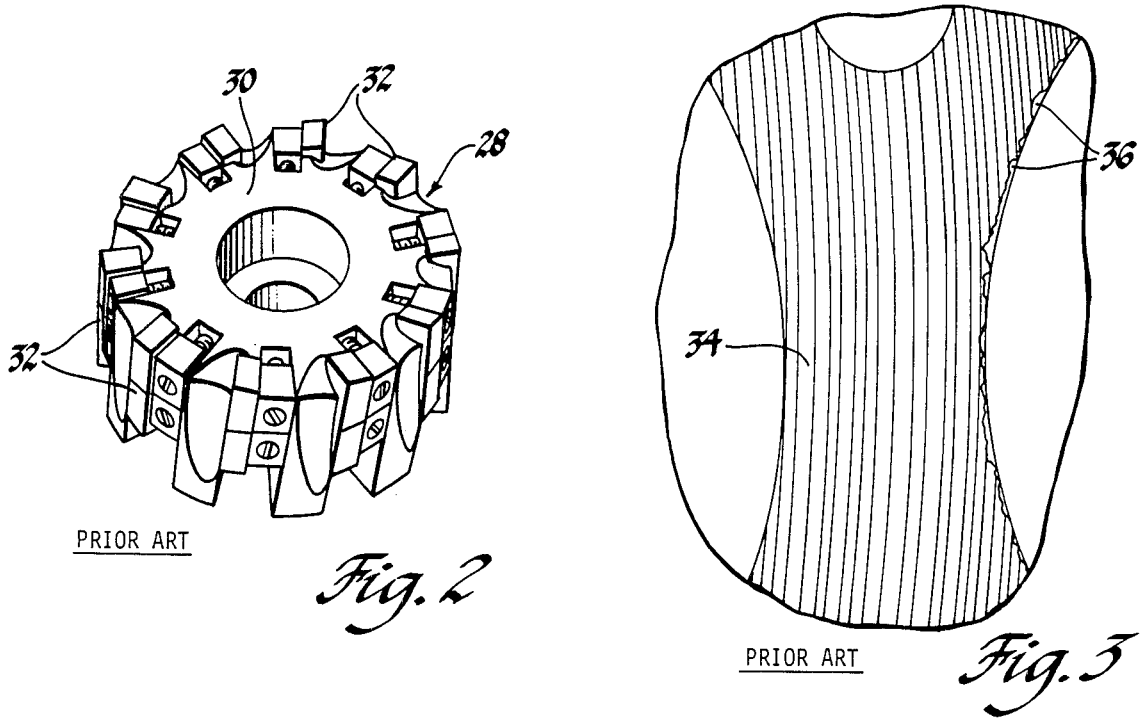
PRIOR ART
Fig. 2
PRIOR ART
Fig. 3

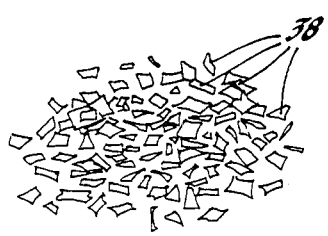
PRIOR ART
Fig. 4
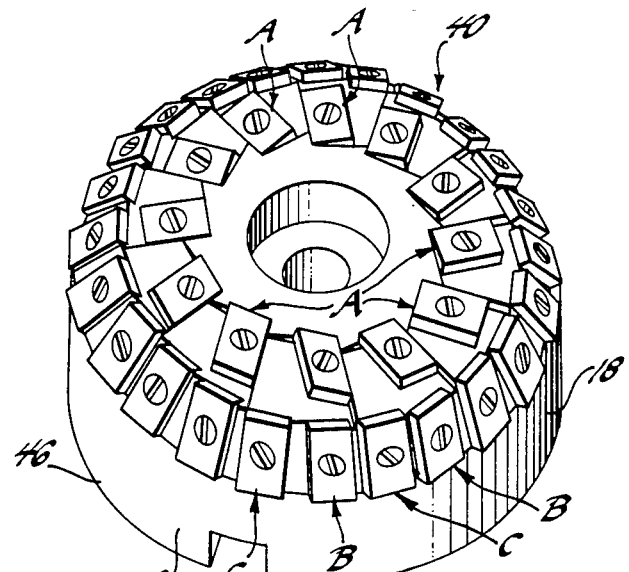
Fig. 5
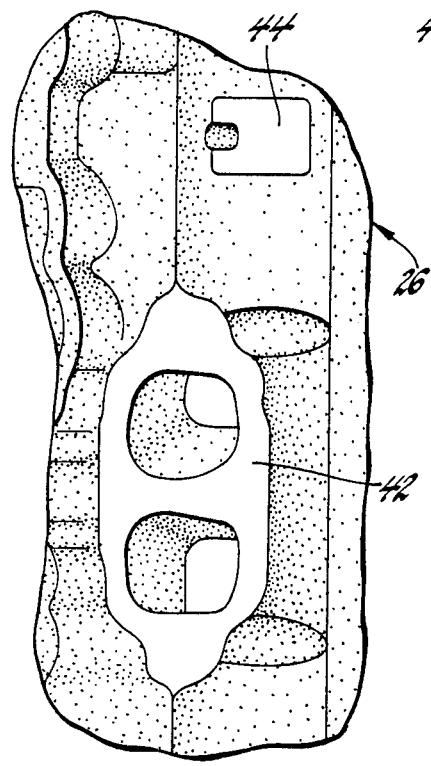
Fig. 6
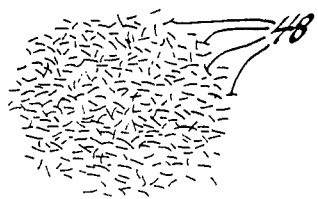
Fig. 7
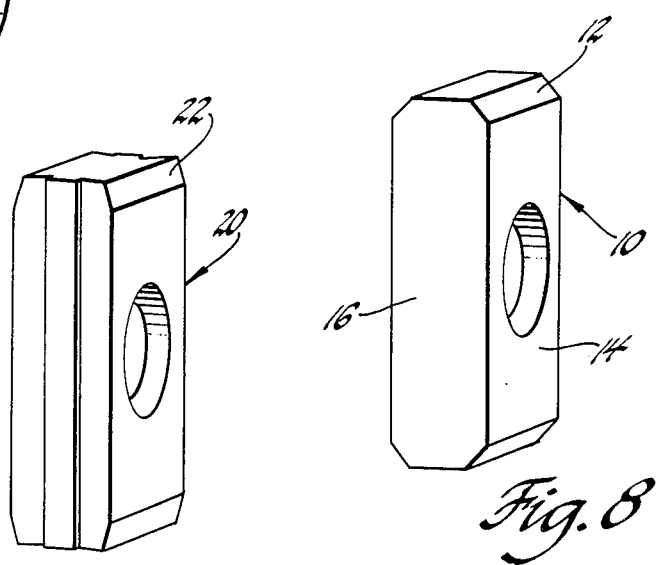
Fig. 9
Fig. 8

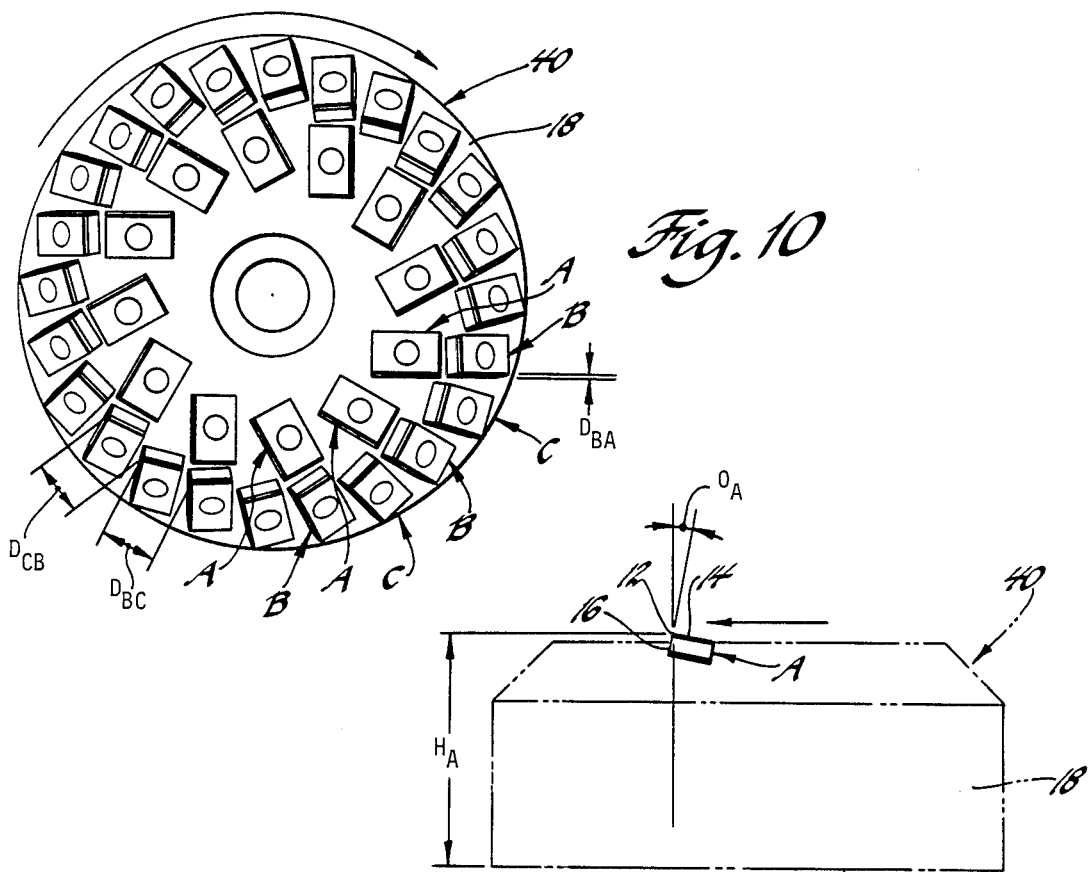
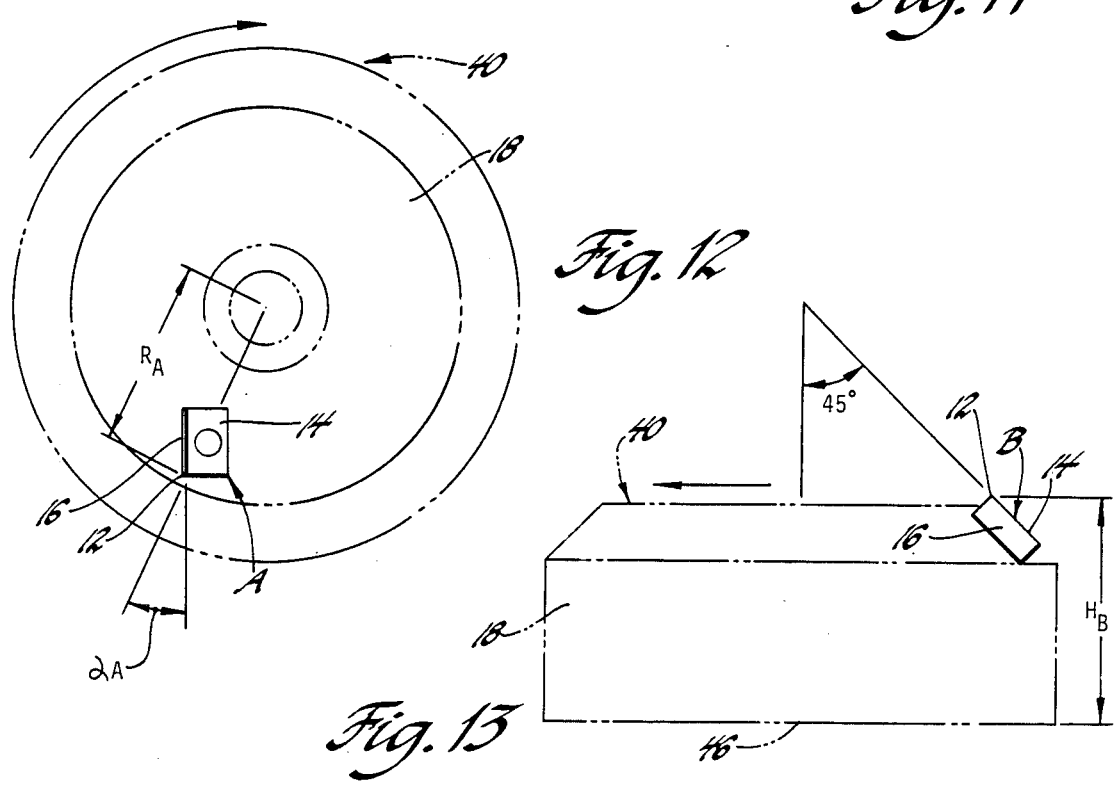

MILLING CUTTER

This invention relates to metal cutting tools in general, and, specifically, to an improved milling cutter of the type that uses indexable cutting inserts.

BACKGROUND OF THE INVENTION

A common metal cutting task, especially in the automotive industry, is the milling of flat, smooth surfaces on metal workpieces that are initially rough, such as cast iron engine blocks and heads. Planning a milling operation involves both the design of the milling cutter, and deciding upon the parameters at which to operate it. The current invention concerns basically the design of the milling cutter. However, the background of both milling cutter design and the parameters of milling operation will be discussed in order, since the two are related.

The subject invention concerns a type of milling cutter known as an "indexable" milling cutter, so called because it uses replaceable, or indexable cutting inserts. The cutting inserts are manufactured in standard sizes from a hard material, such as tungsten carbide (coated or uncoated), silicon nitride or diamond, and may be discarded and replaced when dulled. A typical example of a commercially available indexable insert is the one indicated generally in FIG. 8 at 10. Insert 10 is uncoated tungsten carbide, and has the general shape of a symmetrical rectangular wafer with eight cutting corners, and has a width of 0.375 inches, a length of 0.625 inches, and a thickness of 0.1875 inches. The shape of insert 10 identifies it as what is known in the art as a roughing insert, so called because it is generally used to remove an initial layer of material in the milling process. One of the eight cutting corners of insert 10, which are actually short 45 degree chamfers or flats of approximately 0.015 inches, is indicated at 12. These short chamfered corners 12 are treated as the equivalent of points, for purposes of measuring their geometry and spatial location, which will be further described below. The wider flat portions of insert 10 may be referred to as top and bottom faces 14, and the narrower flat portions may be referred to as side faces 16. Another common type of insert is known as a wiping insert, a typical example of which is designated at 20. Wiping insert 20 is of generally the same shape as 10, with the same width, length and thickness, and also has eight cutting corners, one of which is indicated at 22. The cutting corners 22 of a wiping insert 20 are generally cut at a shallower angle, fifteen degrees here, which gives the corner 22 a longer surface, approximately 0.060 inches. A wiping insert is used to remove a thinner layer of material in a final smoothing operation, and engages the workpiece last. It is known to mount the wiping inserts to either the same or a different milling cutter body as the roughing inserts, although it is generally convenient to use the same cutter body.

Designing an indexable milling cutter consists basically of deciding on a geometry or configuration for the inserts, in terms of radius, axial height, and angular orientation. The payoff for a good design is that, for any given operating parameters and insert material, insert wear will be reduced. Once the geometry is determined, the inserts are conventionally mounted by central threaded fasteners into locating slots cut into a generally cylindrical and rotatable metal cutter body, of which the cutter body 18 of the subject invention, FIG. 5, is a good example. So mounted, each insert presents one cutting corner at a time to the workpiece, which may be referred to as the working cutting corner, with the other seven corners held in reserve. After the working cutting corner has worn with normal use, the insert may be easily removed, turned and remounted to present a new cutting corner to the workpiece. This is known as "indexing" the insert. An insert is indexed until all eight cutting corners are worn, after which it is discarded.

Considering the insert pattern generally, they are mounted in a circular pattern or patterns about the cutter body centerline axis, with the working cutting corners located at a predetermined radius. A basic requirement for the overall size of the insert pattern is that the inserts at the smallest radius must be at least widely enough spaced to cover the entire surface that is to be milled. This is generally stated as a rule that the effective diameter of the cutter must be at least as wide as the milled surface. In fact, it is generally recommended that the effective diameter should be at least 1.6 times width of cut, so that the cutter can be positioned to overhang the surface to be milled by a fourth to a third. The exigencies of the workpiece and the environment may dictate a lesser effective diameter relative to the width of cut, however.

As far as the specific positioning of individual inserts on the cutter body, the cutting corners of inserts of the same type, that is, roughing or wiping, are generally located at the same radius, and also lie in the same plane. This is because the basic theory of operation has been that each insert operates independently of, but in the same way as, every other insert of the same type. Each insert will also generally have a predetermined radial and axial rake angle, terms that will be well known to those skilled in the art. The rake angles of an insert are measured between a reference plane and a reference face of the insert. The reference plane is the plane that passes through the cutter body centerline axis and the insert's working cutting corner (which is treated as a sharp corner, even if it is a short chamfer). The insert reference face is the face that sees the workpiece, which, of course, is dependent upon the direction of cutter rotation. The insert's radial rake angle is the angle formed by the reference plane and the reference face as measured in a plane perpendicular to the cutter body axis. The insert's axial rake angle is the angle formed by the reference plane and the reference face measured in a plane perpendicular to the radius of the cutter body, at the working cutting corner. A rake angle, radial or axial, is considered positive if the insert reference face, that is, the insert face forming the angle, slopes away from the direction of cutter rotation, and negative if it slopes toward the direction of rotation. Each insert may also have what is referred to as a bevel or lead angle, which is the angle formed between the radially outwardly facing insert edge that includes the working cutting corner and a line parallel to the cutter body axis that passes through the cutting corner. Specifying an axial and radial position for the working cutting corner of each insert, as well as an axial and radial rake angle and bevel angle, serves to absolutely establish each insert's position on the cutter body. Each insert's position relative to the other inserts, which is related to the total number or density of inserts, must also be established. The rule of thumb is that the greatest number of inserts possible, given the room available on the cutter body, should be used.

Operational parameters to be chosen include depth of cut, cutting speed, and linear feed rate. The total metal removal rate is proportional to all three, so it is generally desirable to maximize all three. However, since it is also desirable to minimize tool wear, and since each of the three parameters has a different effect on tool wear, there are trade offs. The one factor that is set in stone for the tool designer is the workpiece. It will have a certain roughness after it leaves the mold, a certain hardness, and the cut to be made will have a certain width. The initial roughness out of the mold will dictate what depth of cut is necessary to work the rough surface down to a suitably flat and smooth final surface. And, since insert wear generally increases with an increase in depth of cut less than it does with an equivalent percentage increase in cutting speed, it is generally recommended to maximize the depth of cut. The cutting speed of any insert, that is, the surface speed in feet per minute of the insert relative to the workpiece surface at the cutting interface, depends on its radius and on the rotational speed of the cutter body. The cutter body is rotated by a milling machine, such as the conventional milling machine 24 in FIG. 1. Those skilled in the art will have a general idea, for any given workpiece material and insert material, what cutting speed to use, knowing what has worked in the past. The possible cutting speed is limited by the relative hardnesses of workpiece and insert material. The art teaches that cutting speed has a large negative effect on insert life as it is increased. Clearly, the harder the insert relative to a given workpiece material, the higher the potential cutting speed. However, the cost of cutting insert materials goes up more than proportionally to hardness, with silicon nitride, for example, being significantly more costly than tungsten carbide and diamond being more expensive yet. The designer will naturally desire to use the least costly, softest possible insert material. The rotating cutter body 18 is also driven linearly by the milling machine 24 across the workpiece at a desired feed rate. Once a cutting speed is chosen, a feed rate is determined. This may be determined by choosing a feed per insert (sometimes expressed as a feed per blade), and multiplying it by the number of inserts. Since insert wear does not go up as steeply with increasing feed rate as it does with increasing cutting speed, it is also generally recommended that feed per insert be pushed as high as possible. As a practical matter, an operator, given a depth of cut, cutting speed, and insert material, would probably test the feed rate by pushing it progressively higher, and stop at the highest feed rate consistent with economically acceptable tool wear and surface quality.

What is economically acceptable is subjective, of course, but the past experience of the inventors of the subject invention provides perhaps the best evidence of what was considered possible prior to the invention. Trade literature on speeds and feeds is sometimes difficult to compare, because depths of cuts and surface qualities may not be specified. With the subject invention, however, only the milling cutter design was changed, with all other factors, like the milling machine, workpiece and operating parameters, remaining substantially the same. In general, prior to the subject invention, an economically unsatisfactory choice for insert material, and a very costly and high rate of insert wear, were tolerated in order to achieve acceptable productivity and surface quality. A typical workpiece was the cast iron engine head 26 of FIG. 1, which is grey cast iron with a Brinnell hardness of 187 to 255, and a total carbon percentage by weight of 3.00-3.50. The milling cutter previously used was of the type known as a slash mill, indicated generally at 28 in FIG. 2. Slash mill 28 has a cutter body 30 to which ten inserts 32 are mounted, all at the same radius, axial depth and angles, as well as evenly circumferentially spaced. Slash mill 28 was run at an RPM of approximately 3,000 to 3,500, and at a feed rate of approximately 240 inches per minute. Even with an insert 32 of diamond, the hardest and most expensive material, the outside limit of the surface quality specification was soon reached, which was easily detectable as a roughening or furrowing of the milled surface. The outside limit would be reached sometimes after as few as a thousand parts per working cutting corner. On milled surfaces with sharp edges, like the surface between the cylinder bores of the engine block 34 of FIG. 3, edge chipping or breakout 36 would begin to occur at an early point, also necessitating insert indexing. It is now thought that these problems were caused by the size of the metal chips produced by the slash mill 28, indicated at 38 in FIG. 4. These measure on average about 0.006 inches in thickness, and 0.120 inches in width. At the time, however, no cutter tried had given a significantly smaller chip. While a smaller chip might have resulted in a better surface quality, at least, there was no indication in the art that smaller chips would have resulted in improved insert life and reduced insert wear at the high cutting speeds involved. If anything, the skill in the art indicated that minimizing feed per insert, which would logically lead to smaller chips, would decrease productivity.

SUMMARY OF THE INVENTION

The invention provides an indexable milling cutter in which the inserts are mounted in a new configuration that is effective, at comparable operating parameters, to produce a metal chip of reduced size. Surface quality is improved and insert life is extended by a very significant factor, all with a relatively soft and inexpensive insert material.

The preferred embodiment disclosed uses commercially available inserts of the type described above, manufactured of uncoated tungsten carbide, and conventionally mounted to a generally cylindrical rotatable cutter body. A milling machine of the type described above is also used, and is operated at comparable speed and feed on the same workpiece material. Given the comparable operating parameters, unit productivity in terms of time per workpiece milled is also comparable. Overall productivity, in terms of workpieces per day, is significantly improved, since the inserts last far longer.

A plurality of inserts of the roughing type described above are arranged in a configuration that includes twelve generally evenly circumferentially spaced pairs of adjacent inserts. The first insert of each such pair is located with its cutting corner at the greatest radius and the lowest axial height relative to the cutter body. The first insert further has a substantially neutral axial rake angle, a negative radial rake angle of approximately twenty four degrees, and a bevel angle of approximately forty five degrees. The second insert of each pair is located with its cutting corner at a predetermined axial depth differential relative to the first insert and at a predetermined radial differential relative to the first insert. The second insert further has a small negative axial rake angle of approximately five degrees, and substantially the same radial rake angle and bevel angle as the first insert. The first and second inserts are closely packed or intermeshed, so that the cutting corners of the inserts of each pair have a small circumferential spacing. In addition, twelve wiper type inserts are mounted inboard of the paired roughing inserts to provide a final polishing action.

Mounted in the configuration disclosed, with the predetermined radial and axial differentials between the paired inserts, with the close circumferential spacing, and with the differing rake angles and the bevel angle, the paired inserts cooperate to break the initially rough workpiece surface into chips of reduced size. The chips are sufficiently small to create a suitably flat final surface on the workpiece that stays within specification quality, but wear on the cutting corners of the inserts is substantially reduced and insert life is significantly increased. These benefits are obtained despite the use of the softer and less costly tungsten carbide insert.

It is, therefore, a general object of the invention to provide an improved milling cutter of the indexable type in which conventional inserts are mounted in a new configuration so as to give reduced insert wear and consequently improved insert life.

It is another object of the invention to provide such a configuration in which the inserts are arranged in multiple sets of inserts, each set having a first insert mounted with its cutting corner located at the greatest radius and the lowest axial height relative to the cutter body, and having an adjacent second insert with its cutting corner located at a predetermined radial differential and predetermined axial depth differential relative to the first insert, and in which the cutting corners of the two inserts of each set have a predetermined circumferential spacing, with the predetermined differentials and circumferential spacing being chosen so that the insert sets cooperatively act to break up the workpiece surface into chips of reduced size, giving an improved surface quality and reduced insert wear.

It is yet another object to provide an insert configuration in which the inserts are arranged in multiple pairs having first and second inserts of the type described, and in which the first insert of each pair has a substantially neutral axial rake angle, and in which the second insert of each pair has a small negative axial rake angle.

It is still another object of the invention to provide an insert configuration of the type described in which the first and second inserts also have significant bevel angles.

DESCRIPTION OF THE PREFERRED EMBODIMENT

These and other objects and features of the invention will appear from the following written description, and from the drawings in which:

FIG. 1 is a view of part of a milling machine to which a preferred embodiment of the invention is attached and to which a workpiece is fixtured;

FIG. 2 shows a prior art milling cutter;

FIG. 3 shows a surface milled by the milling cutter of FIG. 2;

FIG. 4 shows metal chips produced by the milling cutter of FIG. 2;

FIG. 5 is a perspective view of the preferred embodiment of the milling cutter of the invention;

FIG. 6 shows a surface milled by the milling cutter of the invention;

FIG. 7 shows metal chips produced by the milling cutter of the invention;

FIG. 8 shows a commercially available roughing type indexable insert;

FIG. 9 shows a commercially available wiping type indexable insert;

FIG. 10 is a plan view of the preferred embodiment of the invention;

FIGS. 11 through 17 illustrate the specific locations of particular inserts of the preferred embodiment.

Figure 14:
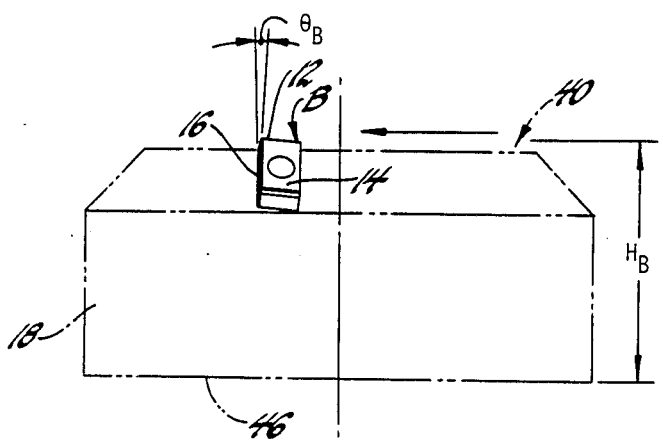

Referring first to FIGS. 1 and 6, the environment in which the invention is used is illustrated. Milling machine 24, referred to above, is commercially available from suppliers such as the F. Joseph Lamb Company, and will be familiar to those skilled in the art. A workpiece, in this case the cast iron head 26 described above, is shown fixtured in position to be milled by a preferred embodiment of the milling cutter of the invention, indicated generally at 40. The surface of head 26 that is to be milled is the exhaust surface, which averages approximately two to two and a half inches in total width. The surface to be milled actually consists of several smaller surfaces, including the exhaust ports 42 and sensor pads 44, one each of which is illustrated, although there are several in a line. These surfaces are illustrative only, of course, and a milling cutter like 40 is usable on any surface, if given a sufficient effective diameter and constructed with the basic insert configuration to be described below.

Referring next to FIGS. 5 and 10, the cylindrical cutter body 18 of milling cutter 40 is what is referred to generally as a flat back cutter, signifying that it has a generally planar rear surface 46. Cutter body 18 has an outside diameter of approximately 4.5 inches, and is approximately 2.0 inches thick. The centerline axis of cutter body 18, and the rear surface 46, provide convenient reference frames for describing the exact locations and orientations of the various inserts. Twenty four inserts 10 of the type described in detail above are mounted, by conventional central threaded fasteners, in a generally circular pattern around the periphery of cutter body 18. The inserts are mounted so that their cutting corners are presented to, or "see", the workpiece, and the direction of cutter rotation is indicated by the arrow. Rather than being mounted all at the same radius, same axial height, and with the same angular orientation, as in a conventional milling cutter, the inserts 10 are mounted in what may be conceptualized as twelve sets or pairs, which pairs are substantially evenly circumferentially spaced around the periphery of the cutter body 18. The twenty four inserts 10 may also be conceptualized as two intermeshed circular rows or patterns of twelve inserts each, with the inserts of the two patterns having differing locations and orientations, while each insert of the same pattern has the same location and orientation. However conceptualized, the twenty four inserts 10 may be better distinguished by the letters C for the first insert of each pair, and B for the second insert, rather than the numeral 10. It should be kept in mind, however, that inserts C and B differ only in their location and orientation, not in their individual shape. There are also twelve wiping inserts 20 of the type described above, which are located generally inboard of the C and B inserts and which are indicated by A. The exact spatial location and angular orientation of one A, B and C insert will be next described, which will serve to describe the entire configuration, since it repeats all the way around. Then, the location of the inserts relative to one another, that is, their density or packing, will be described. The location of all inserts, radially and axially, is measured to the cutting corners 12, which are treated as sharp corners. The angular orientations are measured relative to the reference plane and the face 16 that is the reference face described above.

Referring next to FIGS. 11 and 12, each wiping insert A is located with its cutting corner 22 at the highest axial height of all the inserts. Insert A's axial height, designated Ha, measures approximately 2.001 inches relative to the cutter body back surface 46, with a tolerance of plus or minus 0.0005 inches. The tolerance must be held tightly, since insert A does the final finishing or polishing. Insert A is also located with its cutting corner 22 radially innermost of all the inserts, and its radius Ra is approximately 1.625 inches measured from the centerline axis of cutter body 18, plus or minus 0.003 inches. This translates into an effective diameter, therefor, of twice Ra, or 3.250 inches. The radial rake angle of insert A, Alpha-a, is approximately negative twenty five degrees, plus or minus half a degree. Insert A's axial rake angle, Theta-a, is approximately negative ten degrees, plus or minus half a degree. Insert A has essentially no bevel or lead angle, so none is illustrated. While the straight line cutting corner-to-cutting corner spacing of the various insert A's is not illustrated specifically, it is enough to know, given the other dimensions just described, that they are substantially evenly circumferentially spaced.

Figure 15:
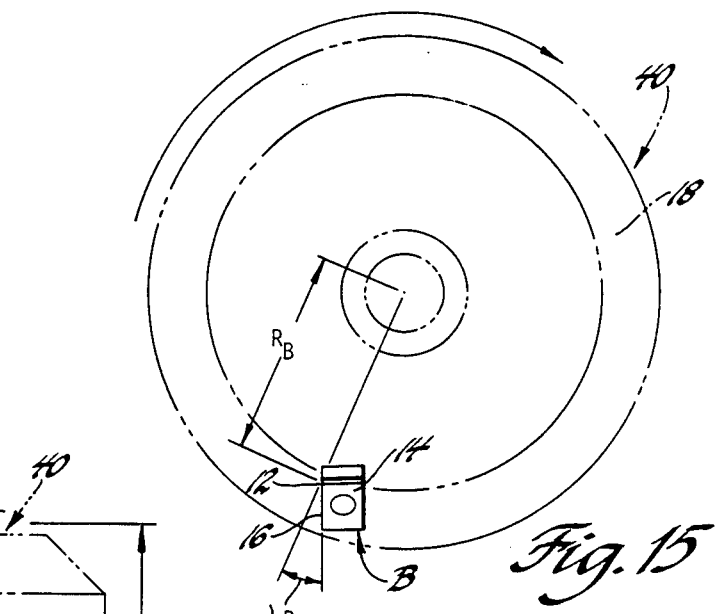

Referring next to FIGS. 13 through 15, the equivalent dimensions for the B inserts are illustrated. Insert B's axial height, Hb, is approximately 1.998 inches, plus or minus 0.0005 inches. Again, the height tolerance is tightly held to assure that a suitably thin layer of workpiece metal will be left for insert A to finish. Insert B's radius, Rb, is approximately 1.813 inches, plus or minus 0.003 inches. Insert B's radial rake angle Alpha-b, is approximately negative twenty three degrees, plus or minus half a degree. Insert B's axial rake angle, Theta-b, is approximately negative five degrees, plus or minus half a degree. Insert B does have a significant, substantial bevel or lead angle, shown in FIG. 13, of approximately forty five degrees.

Figure 16:
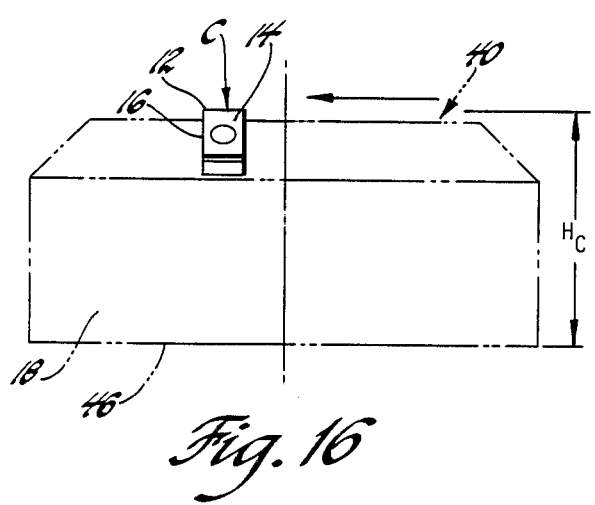
Figure 17:
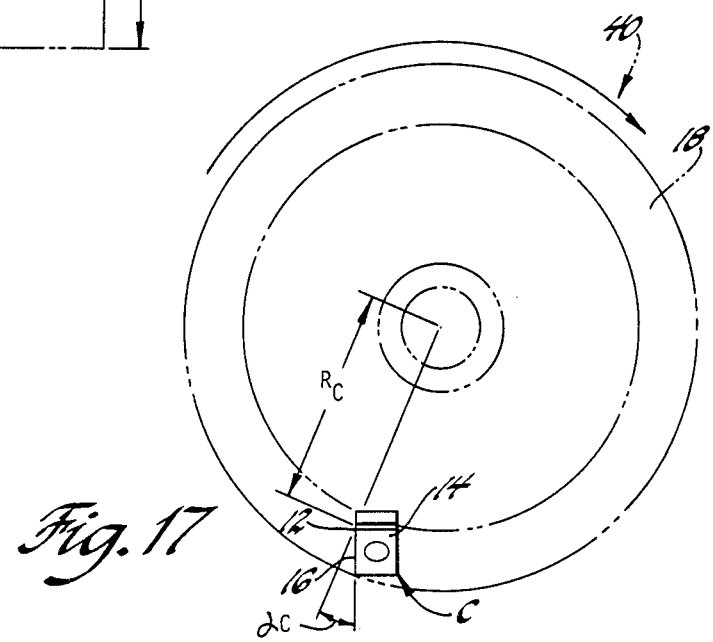

Referring next to FIGS. 16 and 17, the equivalent dimensions for the C inserts are illustrated. Insert C's axial height, Hc, is the lowest of all the inserts relative to the back surface 46, since it sees the workpiece first, and is approximately 1.957 inches, plus or minus 0.001 inches. C's axial height need not be held as closely relative to B's as B's is held relative to A's, since B is not a wiping insert. Insert C's radius, Rc is the greatest of all the inserts, thereby assuring that it sees the workpiece first as the cutter 40 is advanced. Rc is approximately 1.861 inches, plus or minus 0.003 inches. Insert C's radial rake angle Alpha-c, is close to B's, approximately negative twenty four degrees. Insert C's axial rake angle is essentially zero or neutral, and is not illustrated. Insert C has essentially the same bevel or lead angle as B, which is also not separately illustrated.

Thus, it will be apparent that the C and B inserts, whether they be conceptualized as adjacent pairs, or as intermeshed circular rows or patterns, have a predetermined small radial and axial depth differential relative to one another, which may be easily calculated from their absolute radial and axial positions on the cutter body 18. The radial differential of the A and B inserts is approximately 0.188 inches. The radial differential of the B and C inserts is approximately 0.048 inches. The axial differential of the A and B inserts is approximately 0.003 inches, which is quite small since the A inserts do the final finishing. The axial differential of the B and C inserts is approximately 0.04 inches. The C and B inserts also have differing axial rake angles, which alternate from C to B, moving in the direction of rotation, from essentially zero to the small negative axial rake. Those predetermined small differentials, that is, the distances by which the B insert cutting corners lag radially behind and rest axially above the C insert cutting corners, are thought to be important to the cooperation between the B and C inserts that yields the improved results, as will be further described below.

Just as important to the cooperation between the C and B inserts, it is thought, is the measure of their density, or how closely they are packed in the circumferential sense. Expressed conversely, the C and B inserts, if they were fewer in number, could still have all the same radial and axial differentials, as well as the same alternating axial rake orientation described above, and yet still be so far apart on the cutter body 18 as to not effectively cooperate. The B and C inserts are fairly closely packed. As indicated in FIG. 10, the straight line, cutting corner-to-cutting corner distance from each C to its adjacent B insert, moving in the direction of cutter rotation and designated Dcb, is approximately 0.461 inches. The Dcb distance may also be referred to as the circumferential spacing between the C and B inserts, moving in the direction of rotation. The straight line, cutting corner-to-cutting corner distance from each B insert to its adjacent C insert, again moving in the direction of cutter rotation and designated Dbc, is not the same, and is approximately 0.505 inches. Dcb and Dbc may also be conveniently thought of as lesser and greater, or alternating, pitches. Also, while each of the twelve wiping inserts A is mounted with its side face that sees the workpiece essentially aligned with the equivalent side face of a B insert, that alignment is not perfect, in the embodiment disclosed. Thus, there is a small distance Dba, measured perpendicularly between the planes of the two side faces described, of approximately 0.007 inches. Knowing the dimensions described above, one skilled in the art should be able to reproduce the preferred embodiment 40 of the cutter of the invention.

Referring now to FIGS. 1, 6 and 7, the cutter 40 is operated essentially the same as the prior art cutter 28 described above, and on the same workpiece 26. More specifically, cutter 40 is rotated at approximately 3,410 RPM, with a feed of approximately 240 inches per minute. Cutter 40 is set relative to the initially rough surface of the workpiece 26 for a depth of cut of approximately 0.105 inches. Cutter 40 is also given a very slight cant or tilt as it is linearly driven across the surfaces 42 and 44, which is standard practice to avoid dragging the rear inserts. Cutter 40 is driven linearly along a center or median line down the exhaust port surfaces 42, so the cut could be considered essentially a straddle cut, as it is known in the art. The exact mechanism of the cooperation between the C and B inserts is not perfectly understood at this point, but the results have been significant and surprising, as compared to the prior art slash mill described above. Because of the comparable feeds and speeds, the milling time per workpiece 26 has been comparable. However, the quality of the surfaces 42 and 44 has been improved, remaining well within specification over a significantly greater number of workpieces per insert cutting corner. That improved surface quality is evidenced by the reduced size metal chips 48 produced, see FIG. 7. Chips 48 average approximately 0.006 inches in thickness, but only about 0.010 inches in width, far smaller than the prior art chips 38 described above. Insert life has been significantly extended as well, and workpieces per index with the cutter 40 have been as high as seven or eight thousand parts per cutting corner (per index), as compared to about a thousand with the slash mill 28 on the same workpiece 26. This is even more significant when it is recalled that the insert material that was finally resorted to with the slash mill 28 was industrial diamond, which is far harder and more costly than the uncoated tungsten carbide used with cutter 40. Thus, real productivity has gone up significantly, since the downtime caused by frequent insert indexing has fallen considerably. Every factor of cost, quality and productivity has been improved.

The basic insert configuration of the invention is definitely effective to produce the smaller chips 48, and this improved result has been obtained with cutters larger than cutter 40, but having the same basic configuration. It is thought that the reduced size of the chips 48 results from a difference, compared to prior cutters, in the way that the B and C inserts attack and break up the initially rough surface of the workpiece 26. It appears that the inserts act cooperatively, in concert. This cooperative action is in contrast to a conventional high density milling cutter, in which all inserts that are of the same type, whether roughers, finishers, or wipers, operate independently of other inserts of the corresponding type. As far as the specific inserts that cooperate, it is thought that the B and C inserts, at least, work together to break up the workpiece surface. It is thought that the A inserts probably act independently of the C and B inserts to simply polish the already flattened surface, although that is not certain at this point. As far as the aspects of the basic configuration that allow that cooperation, it is thought that the smallness of the radial and axial differentials between the cutting corners of the B and C inserts, as well as their circumferential spacing Dcb and Dbc, are important. Relative to the two different Dcb and Dbc pitches, both their absolute smallness, which is a reflection of the insert density, and the fact that they alternate in the smaller-greater relationship, are considered to be potentially important. The alternating zero-small negative axial rake angles of the C and B inserts are also thought to be significant.

While the exact mechanism of the cooperation is not known, one possibility is that each C insert may act as a lead insert for the trailing B insert, setting up an initial metal chip to be acted on by the closely following trailing B insert. Or, each B insert may act as a lead insert for the trailing C insert, setting up an initial metal chip to be acted on by the closely following adjacent C insert. The former possibility seems more probable, since the C inserts are at the greater radius, and engage the workpiece first in time. Some part of the C inserts, given their neutral axial rake, may be acting in effect, as a bearing to impart stability to the cutter. Another possibility, if the C and B inserts are conceptualized instead as being two intermeshed patterns or circular rows of inserts, is that several C inserts at a time may be acting in cooperation with several B inserts at a time, or vice versa. While the exact mechanism of the cooperation between the inserts has yet to be determined, that there is such cooperation is indicated by the fact that other cutters using similar inserts in similar density, but without the unique configuration of cutter 40, do not produce the same small chips 48 at the same operation parameters involved here.

Just as surprising as the smallness of the chips and the improved flatness of the surface is the low wear and long life of the inserts. The teaching of the art outlined above recommends using the highest possible feed per insert to optimize the competing factors of insert wear and productivity, and a higher feed per blade generally results in larger metal chips. The converse is generally thought to be true, as well, that smaller chips are evidence of a low feed per insert, which would not be expected to minimize insert wear. Regardless, the wear on the cutting corners of the B and C inserts over time is very significantly reduced. The art also teaches that the insert material in the most important factor is the performance and life of an insert, and that materials that can better withstand the high temperatures produced at the insert-workpiece interface, such as ceramics and diamond, will last longer. Here, however, the far softer tungsten carbide has unexpectedly lasted far longer and worn less than ceramics and diamond, in the same application. High temperatures are generally thought to soften the insert material, causing increased insert wear. It may be, therefore, that the smaller chips 48, forming more quickly, flying farther and cooling more quickly, are in fact better dissipating the heat. The cooler temperature may reduce insert wear. Consequently, it may be that the smaller chips 48, produced by whatever mechanism, result directly in both the improved surface quality and reduced insert wear.

One skilled in the art can reproduce the cutter 40 described above, essentially exactly, using the same type of inserts disclosed in the same configuration disclosed. To produce a cutter like 40, but of a different or larger size, it would be given a comparable insert density, and the inserts would be given the same basic configuration, in terms of radial and axial differentials between inserts, in terms of their pitch or circumferential spacing, and in terms of the angles of the inserts. Larger diameter cutters, but with the same basic configuration and using more inserts, have been used with success on surfaces wider than the surfaces 42 and 44. The larger diameter cutters, of course, have more inserts in order to keep a comparable insert density. One measure of insert density that can be applied across different size cutters is the number of peripheral inserts, that is, B and C inserts, divided by the cutter effective diameter in inches. For the cutters produced so far, that ratio has ranged from about five and a half to seven and a half, at least for inserts of the particular width described above. By "same basic configuration" it is not meant that the inserts on a different sized cutter would have to have exactly the radial and axial differentials and angles as on cutter 40. For example, on a larger cutter, the absolute value of the greater and lesser pitches given above could differ from cutter 40, since the B and C inserts have a finite width and can not be circumferentially packed with exactly the same density on every size cutter. However, the relative difference between, or ratio of, the greater and lesser pitches for other size cutters should be comparable to cutter 40, if the inserts are given the same basic configuration of cutter 40. The radial rake angles for all of the inserts, A, B or C could range from perhaps negative seven to negative twenty five or twenty six degrees. Radial rake is considered generally to be whatever gives a suitable clearance or relief for the cutting corner as it is presented to the workpiece. The axial rake for the A insert could range from negative ten to negative three degrees. Axial rake for the B insert could range from negative five to negative ten degrees, and from zero to negative one degrees for the C insert. The bevel angle for the B and C inserts could range from forty five to seventy five degrees. The radial differential between the A and B inserts could range perhaps from 0.125 to 0.195 inches, while the axial differential between the A and B inserts could range from 0.0025 inches to 0.0035 inches. Again, that axial differential is small, because the A inserts are not intended to remove much surface material. The radial differential between the B and C inserts could range from 0.020 to 0.050 inches. The axial differential between the B and C inserts could range from 0.03 to 0.04 inches. The axial differentials would be less, of course, if a cutter were intended and designed as one that would further finish a surface that had already been rough finished. These ranges are meant to be illustrative of, but not limiting to, the scope of basic insert configuration that comprises the invention. Also, the invention could be extended to include sets of inserts having three or more inserts in each set, rather than just a pair, especially on larger size cutters. Comparable differentials would be maintained between all the inserts in each of the sets. Therefore, it will be understood that the invention is not intended to be limited to just the preferred embodiment 40 disclosed.

The embodiments of the invention in which an exclusive property or privilege are claimed are defined as follows:

1. A face milling cutter that is adapted to be rotated and driven across an initially rough surface of a workpiece to mill a flat surface, said milling cutter comprising,
    a cutter body rotatable about an axis,
    a plurality of cutting inserts, in an annular array each insert having at least one cutting corner and being mounted to said cutter body so as to present said cutting corner to said workpiece, said inserts further being arranged in a configuration that includes multiple pairs of first and second inserts, with the cutting corner of each first insert being located at the greatest radius and the lowest axial height relative to said cutter body, said first insert further having a substantially neutral axial rake angle, and with the cutting corner of the second insert of each set being located at a radial differential relative to said first insert and at a axial depth differential relative to said first insert, said second insert further having a negative axial rake angle, and with the circumferential spacing measured while moving in one circumferential direction from the cutting corner of each said first insert to the cutting corner of each said second insert comprising a lesser pitch, and with the circumferential spacing measured while continuing to move in said one circumferential direction from the cutting corner of each said second insert to the cutting corner of each said first insert comprising a greater pitch, said lesser and greater pitches alternating around said plurality of inserts with the lesser pitches being substantially equal to each other and the greater pitches being substantially equal to each other.

2. A face milling cutter that is adapted to be rotated and driven across an initially rough surface of a workpiece to mill a flat surface, said milling cutter comprising,
    a cutter body rotatable about an axis,
    a plurality of cutting inserts in a generally annular array, each insert having at least one cutting corner and being mounted to said cutter body so as to present said cutting corner to said workpiece, said inserts further being arranged in a configuration that includes multiple pairs of first and second inserts, with the cutting corner of each first insert being located at the greatest radius and the lowest axial height relative to said cutter body, said first insert further having a substantially neutral axial rake angle and a bevel angle, and with the cutting corner of the second insert of each set being located at a radial differential relative to said first insert and at a axial depth differential relative to said first insert, said second insert further having a negative axial rake angle and a nonzero bevel angle, and with the circumferential spacing measured while moving in one circumferential direction from the cutting corner of each said first insert to the cutting corner of each said second insert comprising a lesser pitch, and with the circumferential spacing measured while continuing to move in said one circumferential direction from the cutting corner of each said second insert to the cutting corner of each said first insert comprising a greater pitch, said lesser and greater pitches alternating around said plurality of inserts with the lesser pitches being substantially equal to each other and the greater pitches being substantially equal to each other.

3. A face milling cutter that is adapted to be rotated and driven across an initially rough surface of a workpiece to mill a flat surface, said milling cutter comprising,
    a cutter body rotatable about an axis,
    a plurality of cutting inserts, with each insert having at least one cutting corner and being mounted to said cutter body so as to present said cutting corner to said workpiece said inserts further being arranged in two circular patterns, with the cutting corners of the inserts in the first pattern being located at the greatest radius and the lowest axial height relative to said cutter body, the inserts in said first pattern further having a substantially neutral axial rake angle, and with the inserts in the second circular pattern each being intermeshed with the inserts of the first pattern and located with their cutting corners at a predetermined axial depth differential relative to the inserts in said first pattern and at a predetermined radial differential relative to the inserts in said first pattern, the inserts in said second pattern further having a negative axial rake angle, and with the cutting corners of adjacent inserts in said intermeshed first and second circular patterns further having a lesser circumferential spacing measured while moving in one circumferential direction from the cutting corner of each insert in said first pattern to the cutting corner of the adjacent insert in said second pattern, and a greater circumferential spacing measured while moving in said one circumferential direction from the cutting corner of each insert in said second pattern to the cutting corner of the adjacent insert in said first pattern, said lesser and greater circumferential spacings regularly alternating around said patterns of inserts.

4. A face milling cutter that is adapted to be rotated and driven across an initially rough surface of a workpiece to mill a flat surface, said milling cutter comprising, a cutter body rotatable about an axis, a plurality of cutting inserts, each insert having at least one cutting corner and being mounted to said cutter body so as to present said cutting corner to said workpiece, said inserts further being arranged in a configuration that includes multiple pairs of first and, second inserts, with the cutting corner of each first insert located at the greater radius and having a radial differential relative to each said second insert in the range of 0.020 to 0.050 inches, and with the cutting corner of each first insert located at the lower axial height relative to said cutter body and having an axial depth differential relative to each said second insert in the range of 0.03 to 0.04 inches, each first insert further having an axial rake angle in the range of zero to negative one degrees and a bevel angle in the range of 45 to 75 degrees, each second insert further having an axial rake angle in the range of negative five to negative ten degrees and a bevel angle in the range of 45 to 75 degrees, and, the circumferential spacing measured while moving in one circumferential direction from the cutting corner of each said first insert to the cutting corner of each said second insert comprising a lesser pitch, and the circumferential spacing measured while continuing to move in said one circumferential direction from the cutting corner of each said second insert to the cutting corner of each said first insert comprising a greater pitch, said lesser and greater pitches alternating regularly around said plurality of inserts with a ratio of greater to lesser pitch of approximately 1.1.

* * * * *